United States Patent

Rapp et al.

[11] Patent Number: 6,062,531
[45] Date of Patent: May 16, 2000

[54] SOLENOID VALVE FOR CONTROLLING AN ELECTRICALLY CONTROLLED FUEL IGNITION VALVE

[75] Inventors: Holger Rapp, Heimerdingen; Andreas Kellner, Moeglingen, both of Germany

[73] Assignee: Robert Bosch GmbH, Stuttgart, Germany

[21] Appl. No.: 09/117,892

[22] PCT Filed: Aug. 29, 1997

[86] PCT No.: PCT/DE97/01887

§ 371 Date: Aug. 7, 1998

§ 102(e) Date: Aug. 7, 1998

[87] PCT Pub. No.: WO98/25025

PCT Pub. Date: Jun. 11, 1998

[30] Foreign Application Priority Data

Dec. 7, 1996 [DE] Germany ................. 196 50 865

[51] Int. Cl.[7] .................... F16K 31/40; F16K 47/00
[52] U.S. Cl. .............. 251/50; 251/129.16; 251/129.19; 239/533.8
[58] Field of Search ............ 251/48, 50, 129.16, 251/129.19; 239/533.8

[56] References Cited

U.S. PATENT DOCUMENTS

| 3,661,183 | 5/1972 | Komaroff et al. ............ 251/50 X |
| 4,531,708 | 7/1985 | Livet ............................ 251/48 |
| 5,110,087 | 5/1992 | Studtmann et al. ......... 251/129.16 |
| 5,244,150 | 9/1993 | Ricco et al. ............... 239/533.8 X |
| 5,462,253 | 10/1995 | Asthana et al. .......... 251/129.16 X |
| 5,540,564 | 7/1996 | Klopfer .................... 251/129.16 X |
| 5,547,165 | 8/1996 | Brehm et al. ............... 251/129.16 |
| 5,560,549 | 10/1996 | Ricco et al. ................... 239/533.8 |
| 5,615,860 | 4/1997 | Brehm et al. ............ 251/129.16 X |
| 5,785,298 | 7/1998 | Kumar ....................... 251/129.16 |
| 5,901,941 | 5/1999 | Ricco ........................ 251/129.16 |

*Primary Examiner*—John Rivell
*Attorney, Agent, or Firm*—Ronald E. Greigg; Edwin E. Greigg

[57] ABSTRACT

A solenoid valve including a magnet armature having an armature disk and an armature bolt that is guided in a sliding part. In order to prevent a postoscillation of the armature disk after a closing of the solenoid valve, a damping device is provided on the magnet armature. With a device of this kind, a required short switching time of the solenoid valve can be precisely maintained. The solenoid valve (30) is designated for use in fuel injection systems with a common rail.

6 Claims, 3 Drawing Sheets

SOLENOID VALVE FOR CONTROLLING AN ELECTRICALLY CONTROLLED FUEL IGNITION VALVE

PRIOR ART

The invention is based on a solenoid valve for controlling an electrically controlled fuel injection valve. A solenoid valve of this kind has been disclosed in EP 0 690 223 A2. It is used there to control an electrically controlled fuel injection valve. The valve needle of the fuel injection valve is loaded in the closing direction by a pressure prevailing in a control chamber. The solenoid valve operates in a known manner so that in order to initiate the injection, it initiates a discharge of the control chamber when the magnet of the solenoid valve is excited and the valve needle of the injection valve is consequently lifted up from its seat through the influence of the high pressure acting on it on the other side. In the solenoid valve, the armature is connected to an armature bolt which the valve member of the solenoid valve in turn rests against.

The disadvantage of the known solenoid valve is comprised in that an oscillation of the armature and/or rebounding of the valve member can occur during its operation, which is particularly disadvantageous if a rapid switching sequence of the solenoid valve is required and the intent is to carry out an injection that is controlled by the solenoid valve and is divided into a preinjection and a main injection.

Furthermore, the proposal has already been made to reduce the moving mass of the unit comprising the armature and valve member in such a way that a part of the armature is embodied so that it can move in relation to another part of the armature. However, this results in a disadvantage by virtue of the fact that the part of the armature that can move in relation to the other part postoscillates after the valve member comes to rest against its seat. Through an oscillation of this kind, the armature assumes an indefinite position after a preinjection, which can result in the fact that during the subsequent main injection, different opening times of the solenoid valve can occur with the same triggering, which leads to a variance in injection quantities.

ADVANTAGES OF THE INVENTION

The solenoid valve has the advantage that a rebound of the valve member against its seat and a postoscillation of the first armature part are prevented so that after the solenoid valve closes, this valve member assumes its closed position and after a desired first deflection movement, the armature part assumes its rest position again rapidly before the main injection begins. It is also advantageous that a damping of a deflection movement of the armature part produced in this manner can be achieved without additional parts in that a damping pocket is produced in the region of the armature part.

BRIEF DESCRIPTION OF THE DRAWINGS

Two exemplary embodiments of the invention are represented in the drawings and are explained in detail in the description below.

DESCRIPTION OF THE EXEMPLARY EMBODIMENTS

Figure 1:
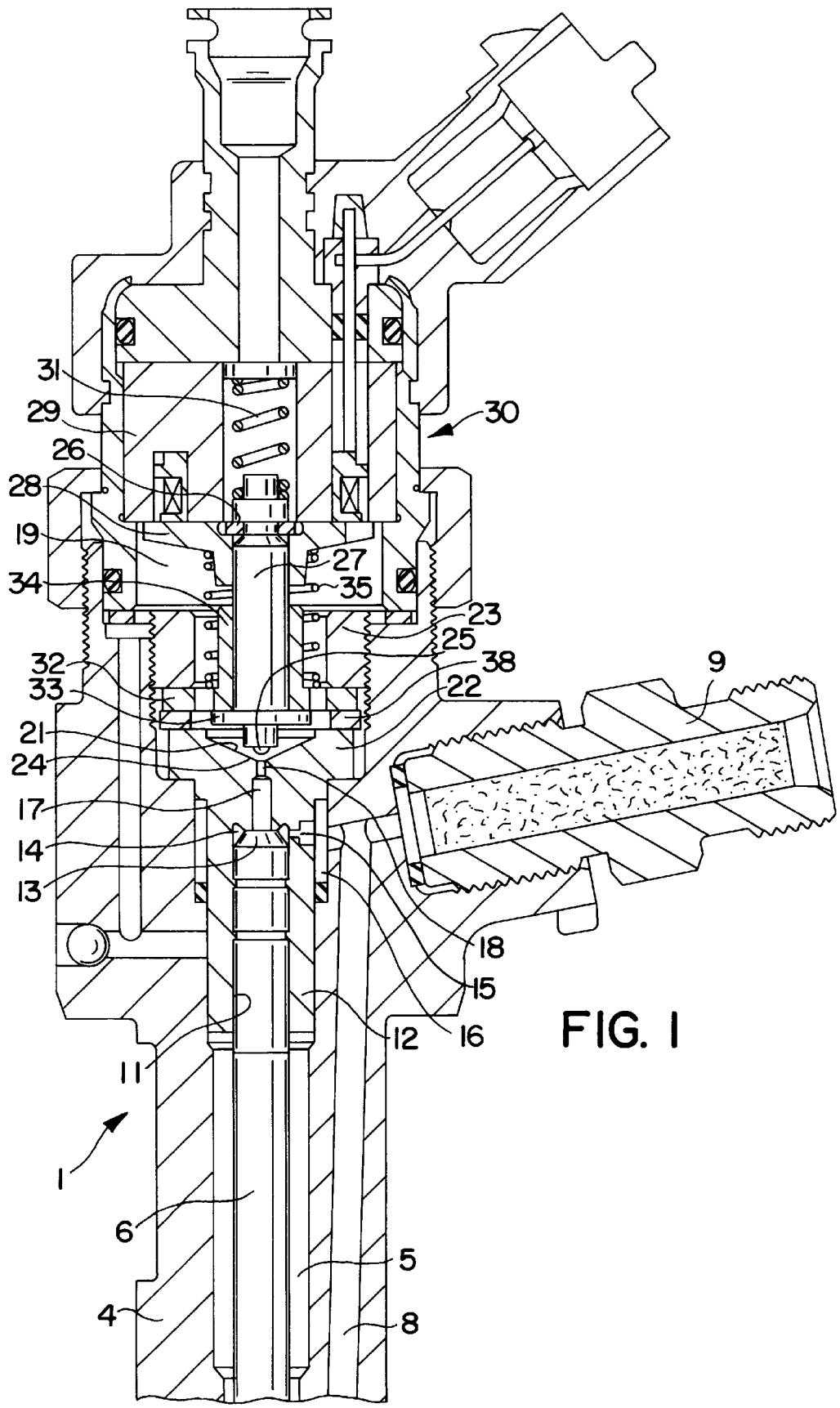
FIG. 1 shows a section through a part of an injection valve with the solenoid valve according to the invention in a sectional view, with an armature plate that is movably coupled to an armature bolt.

FIG. 1 shows a partial section through an electrically controlled injection valve 1 as has been disclosed, for example, by means of the prior art mentioned at the beginning. An injection valve of this kind is designated for use in a fuel injection system, which is equipped with a high pressure fuel chamber that is continually supplied with high pressure fuel by means of a high pressure delivery pump and from which this fuel can be supplied at injection pressure to the internal combustion engine via individual electrically controlled injection valves. The injection valve 1, which is shown partially and in a sectional view, has an injection valve housing 4 with a longitudinal bore 5 which contains a valve piston 6 which on its one end acts on a valve needle, not shown in detail, which in turn cooperates with injection openings of the fuel injection valve in a known manner, e.g. the manner disclosed in EP 0 690 223, which was mentioned at the beginning. The valve piston 6 serves to actuate the valve needle in the closing direction and this valve needle is in turn continually subjected to a high fuel pressure that acts in the opening direction and that is supplied from the high pressure chamber via a pressure bore 8 that extends longitudinally in the valve housing 4. This bore also supplies the injection openings with the fuel quantity to be injected, which is injected into the combustion chamber of the affiliated engine. A connection fitting 9 on the valve housing 4 is provided for connecting the pressure bore 8 to the high pressure chamber.

On its end remote from the valve needle, not shown, the valve piston 6 is guided in a cylinder bore 11 that is let into a valve piece 12. The end face 13 of the valve piston encloses a control pressure chamber 14 in this cylinder bore and via a throttle bore 15 that leads radially through the wall of the valve piece, this control pressure chamber continually communicates with an annular chamber 16 circumferentially encompassing the valve piece, and this annular chamber is likewise in constant communication with the connection fitting 9 and is subjected to the high fuel pressure prevailing in the high pressure fuel chamber.

Coaxial to the valve piston 6, a bore 17 extending in the valve piece 12 branches from the control pressure chamber 14; this bore includes a discharge throttle 18 and feeds into a discharge chamber 19, which in this instance communicates in a manner not shown in detail with a fuel return of the injection valve. The outlet of the bore 17 from the valve piece is produced in the region of a conically countersunk part 21 of the external end face of the valve piece 12. In a flange region 22, the valve piece 12 is clamped to the valve housing 4 via a screw member 23.

In the region of the outlet of the bore 17, a valve seat 24 is embodied in the conical part 21 and cooperates with a valve member 25 of the solenoid valve 30 that controls the injection valve. The valve member 25 is coupled with a two-part armature in the form of an armature bolt 27 and an armature disk 28, and this armature cooperates with an electromagnet 29 of the solenoid valve 30. The armature plate is supported so that it can be dynamically moved on the armature bolt counter to the initial stress force of a restoring spring 35, due to the influence of its inertial mass, and when at rest, is pressed by this restoring spring against a stop ring 26 on the armature bolt. The restoring spring 35 is supported fixed to the housing via a flange 32 of a sliding piece 34 that guides the armature bolt and this sliding piece is clamped in the valve housing along with this flange between the valve piece 12 and the screw part 23. The armature bolt and along with it the armature disk and the valve member 25 connected to the armature bolt are continuously acted upon in the closing direction by means of a closing spring 31 that is supported fixed to the housing so that the valve member 25 is normally in the closed position against the valve seat 24.

When the electromagnet is excited, the armature plate 28 is attracted by the electromagnet and in the process, opens the bore 17 in the direction of the discharge chamber 19.

Between the valve member 25 and the armature plate 28, an annular shoulder 33 is disposed on the armature bolt 27 and strikes against the flange 32 when the electromagnet is excited, thus limiting the opening stroke of the valve member 25. In order to adjust the opening stroke, an adjusting disk 38 is inserted between the flange 32 and the valve part 12.

The opening and closing of the valve needle is controlled by the solenoid valve in the following manner. In the closed position of the solenoid valve member 25, the control pressure chamber 14 is closed in the direction of the discharge side 19 so that by way of the inlet via the throttle 15, the high pressure which also prevails in the high pressure fuel chamber builds up very rapidly. Via the area of the end face 13, the pressure in the control pressure chamber 14 produces a closing force on the valve needle that is greater than the forces acting on the other end in the opening direction as a result of the prevailing high pressure. If the control pressure chamber 14 is opened in the direction of the discharge side 19 through the opening of the solenoid valve, the pressure in the small volume of the control pressure chamber 14 drops very rapidly since this is uncoupled from the high pressure side via the throttle bore 15. As a result of this, the force, which acts on the valve needle in the opening direction and comes from the high fuel pressure prevailing at the valve needle, predominates so that this valve needle moves upward and in the process, the injection openings are opened for the injection. However, if the solenoid valve 30 closes the bore 17 again, the pressure in the control pressure chamber 14 can nevertheless be built up again very quickly by means of the replenishing fuel flowing via the throttle bore 15 so that the original closing force immediately prevails and the valve needle of the fuel injection valve closes. These control events are also sufficient to produce very short injection times as are required in a known manner for a preinjection carried out before a main injection.

Nevertheless, high demands for switching precision must be placed on the solenoid valve. In particular, a rebounding of the valve member and oscillating influences become noticeable, as mentioned at the beginning. A rebounding occurs in this instance when a relatively large mass is accelerated and then suddenly braked in an abrupt manner, when the armature bolt with the armature plate and valve member strike as a mass against the valve seat. However, by virtue of the fact that an essential part of the armature mass, the armature plate, is now supported so that it can be moved on the other part of the armature, the armature bolt, after the valve member 25 comes into contact with the valve seat 24, the armature plate 28 can move further, counter to the force of the restoring spring 35 so that at one time, the effectively braked mass is reduced and the elastic deforming of the valve seat as an energy store, which leads to the disadvantageous rebounding of the valve member, is now more slight. The armature plate that follows furthermore produces a force on the valve member that increases with the compression of the restoring spring 35, which also holds the valve member in a stable fashion against its seat and counteracts the rebounding. This following, however, can as a result disadvantageously produce a considerable oscillation of armature plate 28 in relation to the restoring spring 35 so that when it is necessary to actuate the valve member immediately after this, the positioning of the armature plate is indefinite and a switching of the solenoid valve does not occur rapidly enough or with a reproducibly uniform switching time.

Figure 2:
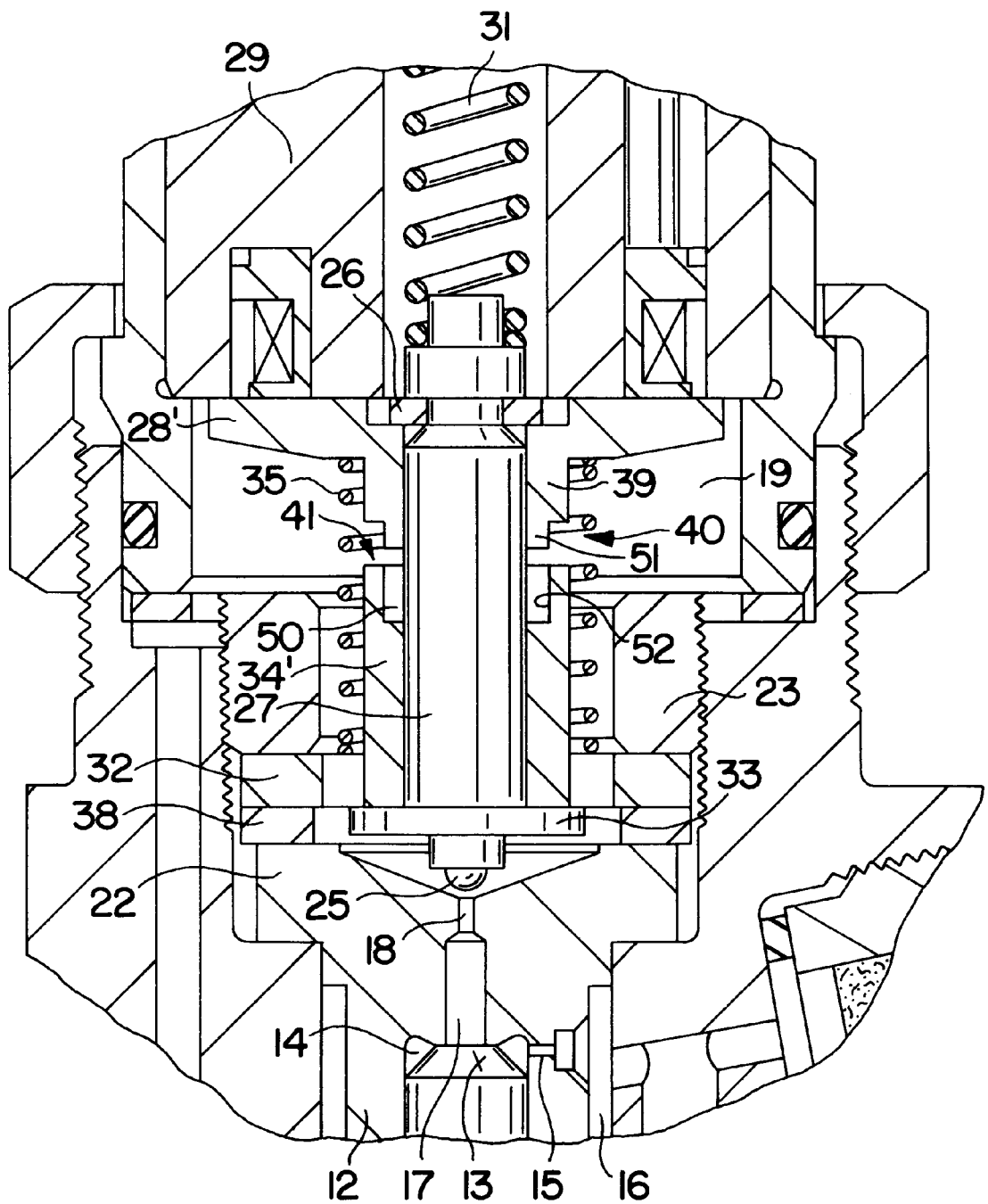
FIG. 2 shows a first type of damping pocket.

In a modification to the embodiment according to FIG. 1, the armature bolt and the armature according to FIG. 2 have therefore been altered. FIG. 2 shows only the part of the armature bolt 27 visible in FIG. 1, with the armature plate 28' and the sliding part 34'. As in the exemplary embodiment according to FIG. 1, the armature is embodied as a disk that adjoins the poles of the electromagnet 29 in a plan-parallel fashion and on the other end, transitions into a slide bush 39 that slides on the armature bolt 27. The slide path is in turn defined on the one end by the stop 26 in the form of a snap ring inserted into the armature bolt 27 and on the other end by the contact of the slide bush 39 with its end face 40 against the end face 41 of the sliding part 34'. The compression spring 35 normally holds the armature plate 28' in contact with the stop 26, as shown in FIG. 2. The end faces 40 and 41 are now embodied so that they form a damping chamber 50 by virtue of the fact that the one end face, e.g. the end face 40 is embodied as stepped, with a projection 51 that protrudes in the axial direction and directly encompasses the armature bolt, and the other end face 41 has a complementary recess 52 axial to the projection 51 so that when there is a relative movement of the armature plate 28' toward the slide bush 39 and the armature bolt remains stationary, the projection dips into this recess and on its end face, encloses the damping chamber 50 in the recess 52, compresses the fuel quantity of the discharge chamber 19 contained there, and as a result brakes the relative movement. In this phase, the armature bolt has brought the valve member 25 into the closed position and is consequently fixed in a stationary manner. By increasing the closing force on the valve member 25 produced by the compression, the following of the armature plate 28' is braked and this is rapidly guided back into a reproducibly constant initial position against the stop 26. The dynamics of the damping are adjusted and the return of the armature plate is made possible through the embodiment of a matching leakage gap between the recess and the projection that dips into it.

Figure 3:
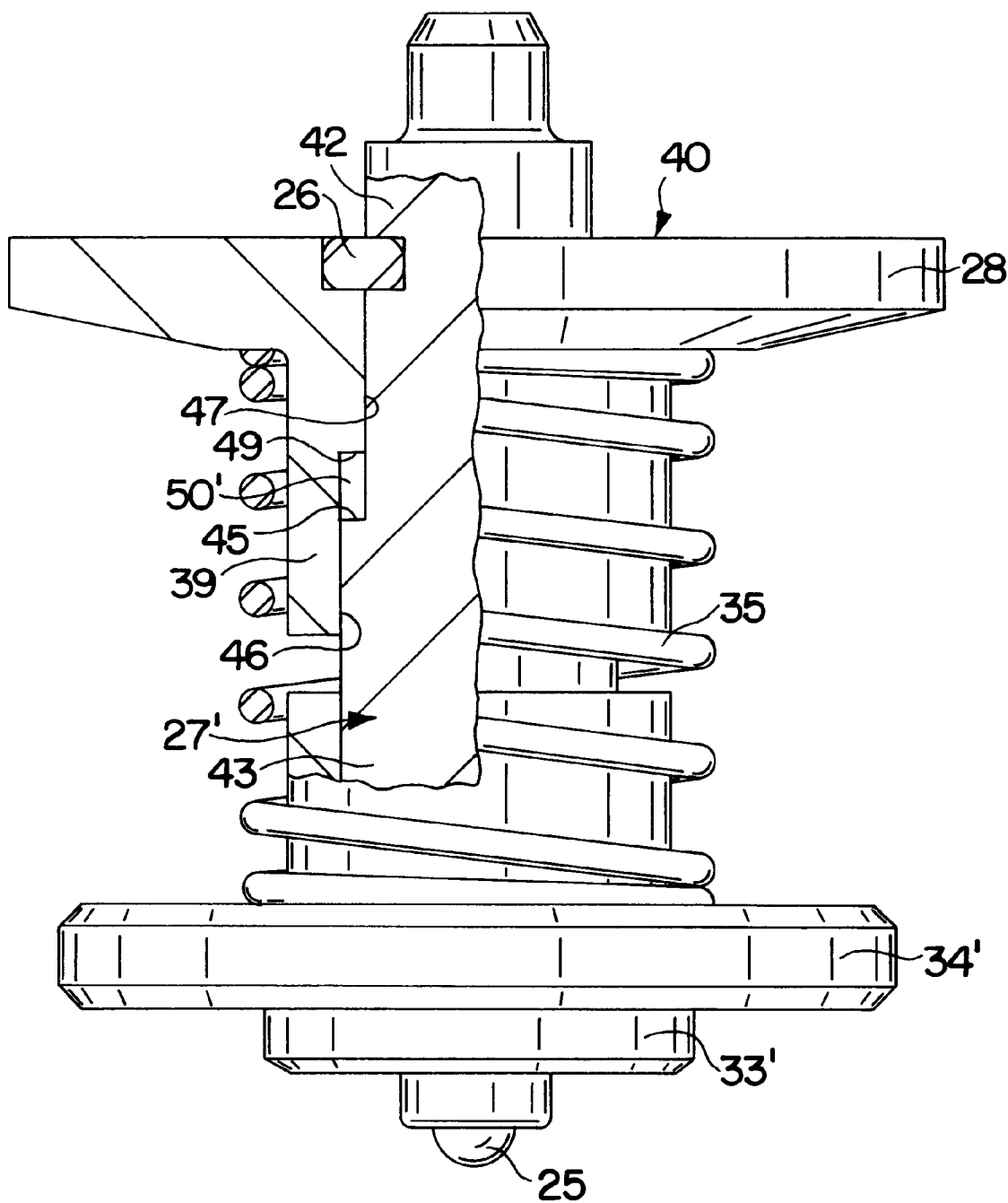
FIG. 3 shows a second type of damping pocket.

In a modification to the embodiment according to FIG. 2, in another embodiment of the invention according to FIG. 3, now the armature bolt 27' is embodied as stepped, with a smaller diameter armature bolt part 42 toward the end of the armature plate 28' and a larger diameter armature bolt part 43 toward the end of the valve member 25. An annular shoulder 45 that points toward the electromagnet 29 is embodied between these two armature bolt parts. Complementary to this, the longitudinal bore through the slide bush 39 of the armature 28' is likewise embodied as a stepped bore, with a larger diameter inner bore part 46 that slides on the larger diameter armature bolt part 43 and a smaller diameter inner bore part 47 that slides on the smaller diameter armature bolt part 42. Both parts likewise transition into one another with an annular shoulder 49 so that a damping chamber 50' is formed between the annular shoulder 49 and the annular shoulder 45 and the adjoining parts of the armature bolt and slide bush, and this damping chamber decreases in size as soon as the armature disk 28', due to its inertial mass, is slid toward the valve member counter to the force of the restoring spring 35 when the valve member comes into contact with its valve seat. A damping of the armature plate motion is produced as in the exemplary embodiment according to FIG. 2, with the advantages disclosed there. The dynamics of the damping are also adjusted for the return motion of the armature plate by way of the leakage gap between the armature bolt and the slide bush. This leakage gap also serves to refill the damping chamber 50'.

The foregoing relates to preferred exemplary embodiments of the invention, it being understood that other variants and embodiments thereof are possible within the spirit and scope of the invention, the latter being defined by the appended claims.

We claim:

1. A magnet valve (30) for controlling an injection valve of a fuel injection device comprising a valve needle (6) whose opening and closing is controlled by the magnet valve, said magnet valve has an electromagnet (29), an armature including first and second parts (28, 27) in which said second part is embodied as an armature bolt, a valve member (25) that is moved with the armature and is urged in a closing direction against a valve seat (24), said first armature part (28) under the influence of an inertial mass is slidingly displaceable relative to said second armature part (27) in a closing direction of the valve member (25) counter to a force of a restoring spring (35), the first armature part includes a hydraulic dampening device which includes a first part and a second part, said first part of said hydraulic dampening device cooperates with the second part of the hydraulic damping device, said second part of said hydraulic damping device is fixed in a stationary way at the latest in the closing position of the valve member, so that revibration of the first armature part (28) in a dynamic displacement counter to the stationarily fixed part reduces a volume of a damping chamber (50, 50') that is enclosed between the first part of said hydraulic damping device and the second part of the hydraulic damping device, and said damping chamber is relieved via a leakage gap formed between the first part of the hydraulic damping device and the second part of the hydraulic damping device.

2. The magnet valve of claim 1, in which the stationarily disposed second part of the hydraulic damping device is a stationary sliding block (34) that guides the armature bolt (27).

3. The magnet valve of claim 2, in which the first armature part (28') has an axially pointing end portion (51), which plunges into a stationarily disposed recess (52), embodied in complementary fashion to the end portion (51), in the sliding block (34) upon a displacement of the first armature part 28', whereupon the recess (52) and the end portion (51) enclose the damping chamber (50), which communicates with a relief chamber (19) surrounding the first armature part (28') and the sliding block (34) via a leakage gap.

4. The magnet valve of claim 1, in which the stationary part is the armature bolt, which is fixed in stationary fashion as a result of striking the valve seat (24) of the valve member (25).

5. The magnet valve of claim 4, in which an annular shoulder (45) is disposed on the armature bolt (27') and is surrounded by a part of the first armature part (28'), and an annular shoulder (49) is also mounted on the first armature part (28'), between the annular shoulder and the annular shoulder (45) of the armature bolt (27') the damping chamber (50') is constantly enclosed, said damping chamber has a communication with a surrounding relief chamber (19) via a leakage gap.

6. The solenoid valve according to claim 5, in which a first annular shoulder (45), which is enclosed by a part of the first armature part (28'), is disposed on the armature bolt (27'), and a second annular shoulder (49) is likewise affixed to the first armature part (28') and between said second annular shoulder (49) and the first annular shoulder (45) of the armature bolt (27'), a damping chamber (50') is continuously enclosed, which communicates via a leakage gap with an encompassing discharge chamber (19).

* * * * *